UNITED STATES PATENT OFFICE.

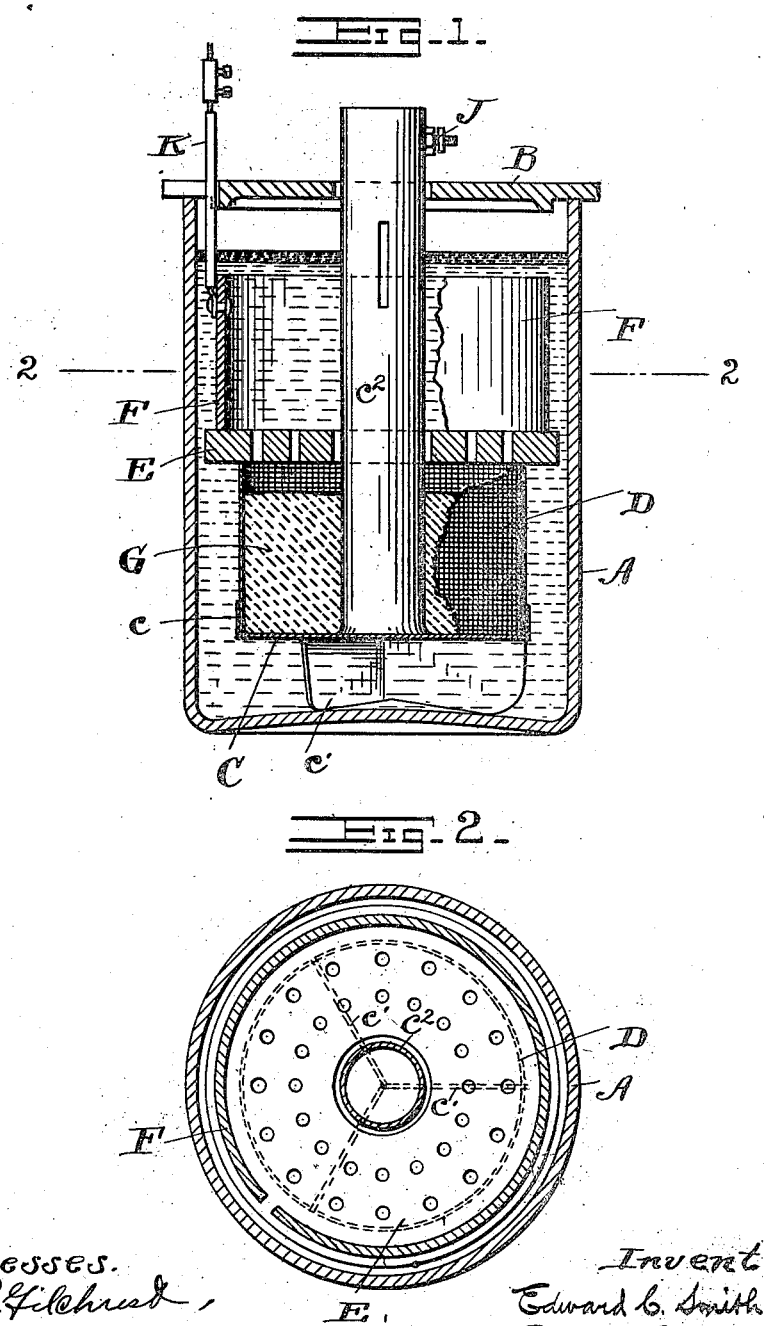

EDWARD C. SMITH AND EDWARD L. MARSHALL, OF FREMONT, OHIO, ASSIGNORS TO NATIONAL CARBON COMPANY, OF CLEVELAND, OHIO, A CORPORATION OF NEW JERSEY.

GALVANIC BATTERY.

1,011,258.      Specification of Letters Patent.      Patented Dec. 12, 1911.

Application filed August 7, 1909. Serial No. 511,667.

*To all whom it may concern:*

Be it known that we, EDWARD C. SMITH and EDWARD L. MARSHALL, citizens of the United States, and residents of Fremont, in the county of Sandusky and State of Ohio, have invented a certain new and useful Improvement in Galvanic Batteries, of which the following is a full, clear, and exact description.

This invention relates to a novel form of closed circuit cell, especially to a cell employing as the electrolyte a caustic solution of soda, potash or the like, adapted to track circuits such as are commonly used in connection with automatic block signals, crossing bells and other protective devices and to other analogous uses.

The objects of the invention are to provide a battery of simple construction which can be easily assembled and renewed, which will have a high internal resistance so that when the battery current is shunted the current drain will be low, and in which there will be a very complete chemical action, and which, for that reason, will have a long life.

A battery embodying the invention in the best form known to us is hereinafter described and the invention is definitely defined in the appended claim and is shown in the accompanying drawings, in which:

Figure 1 is a vertical sectional elevation of a cell embodying the invention; and Fig. 2 is a sectional plan view thereof in the plane indicated by line 2—2 on Fig. 1.

Referring to the parts by letters, A represents the containing jar which may be of glass or porcelain or other suitable material.

B is the cover of the jar.

C represents the bottom plate of a container for the copper oxid to be employed. The member C is in the form of a circular plate, having a marginal flange $c$ turned up around its edge, and it has a suitable number of depending legs $c'$ which rest upon the bottom of the jar and hold the plate C at a suitable distance therefrom. Projecting centrally up from the plate C and passing through a hole in the cover thereof (if a cover be used) is a metal tube $c^2$ which at its upper end carries the binding post J. The container is completed by means of a perforated cylinder D opened at top and bottom which rests upon the plate C inside of the flange $c$.

E represents a perforated grid made of porcelain or other suitable material which is supported upon the cylinder D, and which in turn serves as the support for the zinc element F, which is of cylindrical form.

K represents the metal conductor connected with the zinc element and passing out through the top of the cell where it may be provided with a suitable binding post.

To charge or recharge this battery, the structure consisting of the members C, D, E and F are removed bodily from the jar. This may be done by an operator taking hold of the tube $c^2$,—particularly that part thereof which is above the cover and which, therefore, has had no contact with the electrolyte. Then a suitable quantity of copper oxid G is placed in the container made up of the cylinder D and plate C. The structure, assembled as shown, is then returned to the jar, and enough caustic solution put into the jar to bring its level above the top of the zinc element. Then paraffin oil or some other suitable material is poured on the surface of the solution to prevent the deterioration of the latter in the atmosphere.

In prior constructions of batteries of this type, the zinc element has been extended down near the bottom of the jar. The result is that after a while, and before the copper oxid is all consumed, zincate of soda crystals will form in the bottom of the jar and upon the zinc element, and will serve to check the chemical action long before the complete chemical action has taken place. By placing the zinc near the top of the solution this action is prevented, the result being that the cell remains active a very much longer period than cells such as have heretofore been made. The location of the perforated grid between the zinc and the copper elements produces the desired high internal resistance, and also serves to support the zinc element in the required position.

Having described our invention, we claim:—

In a galvanic battery, the combination of a jar, a container for depolarizing agent in said jar comprising a bottom plate having legs which rest upon the bottom of the jar, said plate having an upwardly extending conducting stem secured thereto, a resistance plate above the container, an electrolyte containing caustic alkali, a zinc element above the resistant plate, said zinc element being spaced a considerable distance above the bottom of the jar for the purpose specified.

In testimony whereof, we hereunto affix our signatures in the presence of two witnesses.

EDWARD C. SMITH.
EDWARD L. MARSHALL.

Witnesses:
 Geo. W. Haynes,
 F. J. Giebel.